Patented Aug. 24, 1948

2,447,772

UNITED STATES PATENT OFFICE 2,447,772

AQUEOUS DISPERSIONS OF BUTADIENE POLYMERS AND TREATMENT OF WOOL THEREWITH

John B. Rust, Montclair, N. J., and Charles W. Pfeifer, Philadelphia, Pa., assignors to Montclair Research Corporation, a corporation of New Jersey No Drawing. Application July 5, 1945, Serial No. 603,406

5 Claims. (Cl. 260—29.7)

This invention relates to the treatment of fibers, more particularly in the form of textiles, to compositions for that purpose, to methods of making such compositions, and to methods of utilizing such compositions for the purposes stated.

It is known that it is possible to produce nonfelting and non-shrinking wool by chlorination and bromination of the wool. There have also been described processes of producing non-felting wools by treatment with alcohol solution of alkalies, by treatment with sulfuryl chloride, nitrosyl chloride, and the like.

Treatment of wool with rubber latex in the presence of quaternary ammonium, phosphonium, and sulfonium compounds and the application of alkylated methylol melamine at relatively high temperatures have also been described. Furthermore, a large number of literature references and references in the patent art may be found wherein the preparation of butadiene polymer emulsions and butadiene copolymer emulsions are described. In the prior art processes of treating wool, difficulties are encountered including danger of damage to fibers, reduced wearing qualities, and undesirable hand, which are difficult to prevent in most of these previously described processes.

It is known that it is possible to produce butadiene polymers and copolymers which are suitable for manufacture of synthetic rubber or elastomers or used as latex to replace natural rubber latex. However, these polymers are entirely unsuited for application to textile fibers since in order to produce good rubbery materials, it is necessary to retain a certain amount of tack and millability. However, when these last described polymers are applied to textiles, high undesirable, sticky or unpleasant feel is imparted to the textile whether it be wool, cotton, or rayon and the like. For certain purposes, such as water-proofed cloth rain coats, where continuous coated surfaces are produced, these properties are highly desirable, but such continuously coated materials, or emulsions used to produce such continuous coated materials are not suitable for the shrinkproofing of wool, or for the treatment of other fibers and textiles in accordance with the present invention. The ordinary butadiene polymer emulsions are very sticky emulsions unsuitable for the purposes in hand.

Among the objects of the present invention is the production of special types of butadiene emulsions or butadiene copolymer emulsions especially suited for the treatment of wool to prevent shrinkage and the treatment of other textiles and fibers to produce improved qualities such as drape, hand, crease control and the like.

Other objects of this invention include the production of treating baths and emulsions which enable the conditioning and treatment of wool and other textiles to produce products of the character set forth above.

Other objects include the production of emulsions especially suited for the treatment of wool to reduce substantially the shrinkage thereof without affecting the original feel and hand of the woolen fabric.

Other objects include the novel products resulting from the utilization of the emulsions of the present invention.

Still further objects of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, aqueous emulsions of a synthetic butadiene polymer are prepared for the treatment of fibers and textiles in which the polymer is in a prevulcanized condition so that upon deposition of the polymer on, in or about the fibers or textiles, the polymer is in a non-tacky condition and gives a non-tacky deposit. Or the polymer in such emulsions utilized in accordance with the present invention is in a condition in which it is substantially insoluble in organic solvents such as benzene, toluene, xylene, carbon tetrachloride, chloroform, and tetrachlorethane, but, however, may be swollen to some extent with such solvents. As formed, the emulsions contain the butadiene polymers and copolymers in a condition in which they are totally unsuitable as synthetic rubber or rubber-like material. If coagulated by any suitable means, the emulsions give crumbly materials which cannot be milled on rubber milling equipment and which are entirely composed of cross-linked polymers. The vulcanization has been carried to a point where substantially no soluble polymer remains, but, as stated above, the gel-forming polymer may be swollen to some extent with the stated solvents.

Emulsions of the character employed in accordance with the present invention may be produced from any of the ordinary aqueous emulsions of butadiene polymers and copolymers by subjecting such emulsions to oxidation to convert them into the condition referred to immediately above. Thus a two stage method is employed for producing the emulsions in which first, the emulsions are prepared by carrying out the polymerization of butadiene or butadiene copolymers in the presence of polymerizing agents in which emulsions the polymer or copolymer is present in such condition that if deposited on fibers a tacky deposit would be obtained, or the polymer is substantially soluble in common organic solvents at this time, or is incompletely vulcanized, and second, the emulsion prepared in the first step is subjected to an oxidative treatment by means of hydrogen peroxide or other substances which liberate oxygen under the conditions of treatment to convert the polymer or copolymer present in such emulsions into a condition where upon deposition on fibers it gives a nontacky deposit, or gives a deposit which is substantially insoluble in common organic solvents, or is substantially completely vulcanized and in the form of a cross-linked polymer. The first step is carried to a point of substantially complete polymerization, by which is meant little or no monomer is present. The emulsion at this point may be subjected to vacuum or other treatment to remove any volatile hydrocarbons which may be present, before the step of oxidative vulcanization. The term oxidative pre-vulcanization may be used to describe the final condition of the polymer in the emulsion without any implication that an oxygen link is necessarily involved.

The polymers in the emulsions employed in accordance with the present invention possess the property of being entirely non-tacky when applied to textile materials or fibers. For example, for the treatment of wool, a shrinkproofing is obtained while the wool otherwise remains unchanged in appearance, possesses good hand and feel, etc. The invention is particularly exemplified in connection with the treatment of wool to produce shrinkproofing, but may be utilized in connection with other fibers and textiles to give such textiles markedly improved characteristics with respect to drape, hand, crease control and the like. The treatment of wool will, therefore, be utilized to exemplify the present invention.

In the shrinkproofing of wool with the emulsions of the present invention, the polymer may be exhausted into the wool fiber without imparting thereto any substantial degree of stickiness or waxy hand. A wool garment, as for instance, a wool sock or sweater is highly objectionable to the wearer, when on contact with the skin, a feeling of oiliness is imparted and the garment no longer feels wool-like. By utilizing the emulsions of the present invention, no objectionable feel is encountered and the garment has an original wool-like hand. The amount of polymer deposited will depend on the methods used and the purposes for which the treatment is applied. For example, as much as 10% of the polymer may be exhausted into the wool from emulsion baths, while as much as 25% may be applied by padding methods.

For application on textile materials, and particularly in connection with wool, it is also highly desirable to have incorporated in the final emulsion after oxidative vulcanization has taken place, an antioxidant, such as an aliphatic and aromatic amine, polyphenol, sulphide, and derivatives of these types of antioxidants, and the like. When the specially prepared emulsions of the present invention are deposited on textile materials, a very great surface of the polymer is exposed and this is subject to oxidative effects causing the polymer in time to become embrittled. While the present invention is concerned with an oxidative pre-vulcanization of the emulsion, it is desirable that this vulcanization not continue after the material has been applied to the textile. Consequently antioxidants are highly important for those utilizations where further change in the deposited material is not to take place.

Thus it has been found that oxidative pre-vulcanization must be resorted to, to produce a material acceptable to the textile trade and consumers. Further, after the oxidative pre-vulcanization has occurred in the emulsion, this emulsion must be protected against further degrading oxidative polymerization which occurs when the large surfaces of the polymer which had been deposited on the textile, is exposed to the air. Thus an essential part of the emulsion of the present invention consists of suitable antioxidants which are added after the oxidative pre-vulcanization of the emulsion has been accomplished, when the emulsions are to be employed for purposes where continuous oxidative degradation is to be avoided.

The utilization of butadiene polymers is emphasized in accordance with the present invention, because for certain purposes, as for example, in the shrinkproofing of wool, the result obtained depends on the presence of such butadiene polymers or butadiene homologue polymers. Straight butadiene polymers or butadiene homologue polymers give notably superior non-felting effects than do butadiene copolymers, in the shrinkproofing of wool, and for such purposes, therefore, the polymeric derivatives from butadiene alone or butadiene homologues alone are preferred to copolymers. The term "straight" may be used to indicate polymers produced from a butadiene or its homologue without interpolymerization with other unsaturated non-butadiene type compounds. The polymeric butadiene derivatives may be for example, the polymers of butadiene and its higher homologues such as isoprene, dimethyl butadiene, ethyl butadiene, ethoxy and methoxy butadiene, cyanobutadiene, and the like, particularly butadiene-1.3 and its derivatives, since as stated, these produce a much superior non-felting effect on wool, than do copolymers containing substantial amounts of other vinyl or methyl substituted vinyl compounds. The butadient polymer itself is thus necessary for the production of good shrinkproofing qualities in wool treated with these emulsions. Butadiene copolymers may be used even in connection with shrinkproofing effects, but in that event, the proportion of the copolymerizing constituent should be within the limits necessary to obtain the results sought. Considering the use of these emulsions for shrinkproofing of wool, it may be pointed out for example, that in a series of copolymers of butadiene with methyl methacrylate, as the methyl methacrylate content of the copolymer increased, the non-felting characteristics imparted to the wool fibers decreased so that a butadiene polymer containing no methyl methacrylate renders wool entirely non-felting whereas a straight methyl methacrylate has no effect upon the felting qualities under the same operating conditions. The same results have been found to be true with every vinyl compound tested. For such shrinkproofing effects it has been found that a methyl methacrylate ester should not be present to an amount exceeding 20% of the interpolymer, an ethyl methacrylate ester to an amount not exceeding 50% of the interpolymer, and a butyl methacrylate to an extent not exceeding 40% of the interpolymer if substantial shrinkproofing effect is to be obtained. Within those limits where shrinkproofing is sought, or in other cases where the treatment of other fibers and textiles is involved and shrinkproofing is not the end sought, vinyl compounds and methyl substituted vinyl compounds may be copolymerized with the butadiene or butadiene derivatives to give compositions having satisfactory properties, the amount of vinyl compound present in the copolymer being regulated as indicated. As illustrative of such vinyl or related components there may be used vinyl acetate, methyl methacrylate, ethyl acrylate, styrene, acrylo-nitrile, vinyl pyridine, methacrylonitrile, isopropenyl methyl ketone, vinyl phenyl ketone, vinyl methyl ketone, and the like.

The emulsifying agents employed in producing the emulsions of the present invention may be any of the usual types of such emulsifying agents including long chain alcohol sulfates, such as sodium lauryl sulfate; aromatic sulfonates, such as sodium amyl naphthalene sulfonate, and the like; soaps, such as sodium laurate, sodium stearate, and the like. In the emulsion, the pH and the type of emulsifying agent may be correlated. With soap, a pH above 7 may be used. With the strong emulsifying agents, a pH below 7 may be used. Generally, in the textile treating bath, a pH below 7 is preferable.

While as stated above, various types of aqueous emulsions of butadiene polymers may be subjected to a prevulcanization treatment in accordance with the present invention, special types of emulsions may also be employed. The emulsion may be of a character such that no deposition of the polymeric butadiene derivative occurs under ordinary conditions in the presence of the fibers for a substantial period of time at a pH below 7. However, in the presence of electrolytes, exhaustion of the bath may take place with varying rapidity, depending mainly upon temperature and electrolyte concentration. Such baths may be produced where even with electrolyte added, no coagulation or precipitation occurs in the absence of the fibers or textiles even on heating for substantial periods. In the presence of the wool, for example, however, deposition occurs. The electrolyte content may vary over substantial limits, therefore, but sufficient electrolyte should be present to condition the bath so that the bath although stable in the absence of wool fibers, will deposit the polymer in the presence of the conditioning electrolyte. As such electrolyte, water-soluble salts may be used, desirably such salts which do not precipitate the polymer. The following are exemplary: sodium sulfate, sodium chloride, sodium bromide, sodium iodide, sodium phosphate, sodium sulfamate, sodium sulfite, sodium bisulfate, sodium bisufite, sodium nitrate, sodium acetate, and the like, or corresponding potassium, lithium, caesium salts, etc. Salts like zinc chloride may also be used where the coagulation does not appear to be too serious since it occurs in small particulate form, and the particles may be redispersed by stirring. Neutral salts, specifically salts of strong bases and strong acids, particularly inorganic salts, are preferred. The term "conditioning electrolyte" may be used to cover such electrolytes which produce the desired deposition of the polymer in the stated baths.

The treatment of the fibers or textiles may be carried out by immersing such fiber or textile in the bath to give the exhaustion desired with the particular emulsion being used. The temperature employed will vary with the different emulsions and operating conditions. While lower temperatures can be used, the operation is desirably carried out at a temperature ranging from about 40° C. to the boiling point of the bath. The process can be applied before or after fulling, weaving, scouring and the like operations. In some cases it can be applied in the dye bath. Mixed goods including wool-cotton, wool-rayon, etc., can be treated by this method without any deleterious effect. The wool may be subjected to a pretreatment, as for example, chlorination or bromination, before being treated in accordance with the present invention.

After treatment in accordance with the present invention, the wool or other textile or fiber may be rinsed and dried. Wool treated in accordance with the present invention has its properties altered to such a degree that it no longer has a tendency to felt during washing and consequently is non-shrinking also; while other fibers have their qualities and characteristics improved along lines indicated.

The term "particulated" may be used hereinafter with respect to the treated textile or fiber carrying polymer deposited on the textile or fiber in accordance with the methods, baths, and emulsions of the present invention.

The following examples will illustrate the invention, the parts being by weight.

*Example 1.*—A butadiene polymer emulsion was prepared as follows. 105 parts of a buffer solution of pH=11, 0.56 part of ammonium persulfate and 5 parts of soap ("Ivory Flakes") were placed in a pressure reactor cooled to below −5° C. The buffer solution consisted of 35.8 parts of disodium phosphate and 7.16 parts of tri-sodium phosphate dissolved in 980 parts of distilled water. 50 parts of butadiene, which has been passed over calcium chloride and condensed in a second pressure reactor cooled to below −5° C. were now added to the chemicals in the first reactor. The reactor was then sealed and allowed to come to room temperature. It was then placed into an agitator with a constant temperature water bath at 45° C. and shaken for 40 hours. The reactor was taken out, allowed to cool, and opened. Only a very slight pressure was observed and no foaming took place when the reactor was opened and thus complete polymerization with a solid content of 33⅓% was indicated. The emulsion was then treated with 5% of 30% hydrogen peroxide at 90–100° C. for one hour. Foaming took place initially which finally subsided. An emulsion was formed whose polymer was completely insoluble in organic solvents, indicating a very high degree of oxidative prevulcanization.

Such emulsion applied to the treatment of wool as set forth above, produces good shrinkproofing, a good hand, and the original wool-like appearance of the textile.

*Example 2.*—A butadiene-styrene copolymer emulsion was prepared as follows. 45 parts of butadiene, which had been passed over calcium chloride, were condensed in a pressure reactor cooled to below −5° C., 5 parts of styrene, which had been distilled previously, 100 parts of distilled water, 5 parts of a 10% aqueous solution of ammonium persulfate and 5 parts of soap ("Ivory Flakes") were then added to the butadiene in the pressure reactor. The reactor was sealed, allowed to come to room temperature and placed in a shaker with a constant temperature water bath at 45° C. The reactor was shaken for 40 hours. After that period, the polymerization was quite complete since only a trace of pressure was observed on opening the reactor at room temperature. The solid contents of this emulsion was, therefore, 33⅓%. The emulsion was treated with 5% of a 30% hydrogen peroxide solution for one hour at 90–100° C. Considerable foaming was encountered and some slight separation of polymer was observed during the reaction which removed by subsequent filtration. The polymer contained in the emulsion was entirely insoluble in organic solvents indicating a complete oxidative pre-vulcanization.

Such emulsion may be utilized as set forth above in the treatment of a wool textile and results in excellent shrinkproofing of the wool, good hand and a wool-like appearance.

Example 3.—A butadiene-α, p-dimethyl styrene copolymer emulsion was prepared as follows: 20.0 parts of butadiene, which had previously been passed over calcium chloride and had been condensed, and 5.0 parts of α, p-dimethyl styrene, which had been distilled previously, were placed in a pressure reactor cooled to below —5° C. 50 parts of distilled water, 2.5 parts of a 10% aqueous solution of ammonium persulfate, and 5 parts of soap ("Ivory Flakes") were added. The reactor was sealed and allowed to come to room temperature. The vessel was then placed in a shaker with a constant temperature water bath at 45° C. and left there for 40 hours. At the end of this period the polymerization was quite complete since only a trace of pressure was observed when the reactor was opened at room temperature. The solid content of the emulsion was, therefore, 33⅓%. The emulsion was treated with 5% of a 30% hydrogen peroxide solution for one hour at 90–100° C. The polymer contained in the emulsion was entirely insoluble in organic solvents indicating substantial oxidative vulcanization.

Such emulsion may be utilized in the treatment of wool or other textiles and fibers and when utilized for shrinkproofing of wool, gives good shrinkproofing, with good hand and with wool-like appearance.

Example 4.—A butadiene polymer emulsion was made by mixing 50 parts of monomeric butadiene, 100 parts of buffer solution composed of disodium and trisodium phosphate at a pH of 11, 5 parts of 30% hydrogen peroxide and 5 parts of sodium lauryl sulfate. The mixture was placed in a pressure reactor and heated for 40 hours at 45° C. In this time complete polymerization had occurred as evidenced by the fact that the internal pressure of the reactor dropped to zero. Using the above emulsion, 127 parts of a woolen fabric were treated with 17.1 parts of this emulsion containing .03 part of the monobenzyl ether of hydroquinone as stabilizer. The emulsion was exhausted onto the wool by using a bath ratio of water equivalent to 20 times that of the weight of the wool, 20 parts of 56% acetic acid and 35 parts of sodium sulfate. The polymer was exhausted on the wool fabric in 50 minutes. When rinsed and dried, the woolen fabric exhibited a considerable amount of stickiness; the feel of the wool being somewhat waxy.

192 parts of the above described emulsion, not containing however, any stabilizer, were treated with 9.6 parts of 30% hydrogen peroxide for three-quarters of an hour at 70° C. After this oxidative pre-vulcanization had been carried out, 2% of the monobenzyl ether of hydroquinone based on the polymer content of the emulsion, were added. This vulcanized emulsion was used to treat the same type of wool and in the same proportion as described above. After rinsing and drying, the wool possessed dry wool-like feel, no longer being sticky or waxy. The sticky or waxy feel imparted to the wool by the unvulcanized emulsion is such a serious handicap that commercial use of such material for the usual purposes in treating wool would not be desirable. However, the wool treated with the oxidative pre-vulcanization emulsion had a feel almost identical with that of the untreated wool and would be very acceptable commercially. The shrinkproofing characteristics of the oxidative pre-vulcanized emulsion were excellent and if anything, slightly better than the untreated emulsion.

It has been found in general, that the shrinkproofing characteristics of butadiene emulsions or butadiene copolymer emulsions are somewhat improved by the oxidative pre-vulcanization process of the present invention. So that in accordance with this invention, it is possible to enhance the shrinkproofing characteristics of butadiene polymer emulsions and copolymer emulsions by the process of oxidative vulcanization, as described herein.

Example 5.—50 parts of butadiene monomer, 100 parts of buffer solution composed of disodium and trisodium phosphate at a pH of 11, 6 parts of a 10% solution of ammonium persulfate, and 5 parts of sodium lauryl sulfate were placed in a pressure reactor and heated at 45° C. for 40 hours. Complete polymerization had occurred in this time. 320 parts of this emulsion were treated with 30 parts of 30% hydrogen peroxide solution at 70° C. for 45 minutes. Both the oxidized and unoxidized emulsions were used to treat woolen fabric, as follows: 118 parts of wool were placed in a bath containing 2360 parts of water and 20 parts of 50% acetic acid, 21.7 parts of the emulsion containing .14 part of monobenzyl ether of hydroquinone were added and the bath heated to 60° C. 35 parts of sodium sulfate were slowly added over a period of 50 minutes. Complete exhaustion of the respective emulsions on the wool occurred in this time. The wool pieces were rinsed and dried. The one having deposited the untreated emulsion on it, possessed a characteristic sticky, waxy feel, which was highly unpleasant to the touch. The wool sample carrying the oxidized emulsion possessed a full wool-like feel with no trace of stickiness nor waxiness. Both treated woolen pieces possessed excellent shrinkproofed characteristics.

Example 6.—A butadiene polymer emulsion was prepared in the following manner.

The butadiene was passed over calcium chloride and condensed in a pressure reactor cooled to below —5° C. 75 parts of butadiene were then weighed out in the reactor. While the reactor was still kept in the freezing mixture 150 parts of a buffer solution of pH 11, 7.5 parts of 30% hydrogen peroxide and 7.5 parts of sodium lauryl sulfate were added. The buffer solution of pH 11 had been prepared by dissolving 35.8 parts of disodium phosphate and 7.16 parts of trisodium phosphate in 980 parts of distilled water. The reactor was then closed, allowed to come to room temperature and put in an agitator with a constant temperature bath at 45° C.

After 48 hours the reactor was taken out, cooled and opened. There were no signs of pressure when the reactor was opened. Thus complete polymerization and, therefore, a polymer content of 33⅓% was secured. (Emulsion A.)

Portions of this emulsion were now oxidized by means of various oxidizing agents.

B

| | Parts |
|---|---|
| Emulsion A | 40 |
| Benzoyl peroxide | 4.28 |
| 50% active mixture of sodium alkyl sulfates | 4.28 |

The peroxide and the sodium alkyl sulfate paste were ground together in a mortar, then added to the Emulsion A. The flask was connected to a reflux condenser and the reaction mixture was kept at 80–90° C. for 1½ hours. A slight amount of polymer separated out during the oxidation and it was removed by filtration.

C

| | Parts |
|---|---|
| Emulsion A | 40 |
| Ammonium persulfate | 4.03 |
| Water | 4.03 |

The ammonium persulfate was dissolved in the water and the solution was added to Emulsion A. The mixture was then kept at 80–90° C. for 1½ hours and subsequently filtered as described under B.

D

| | Parts |
|---|---|
| Emulsion A | 40 |
| Acetyl peroxide (4% available oxygen) | 7.06 |
| Mixture of sodium alkyl sulfates | 2.10 |
| Water | 2.00 |

The peroxide, the sodium alkyl sulfates and the water were mixed together thoroughly then added to Emulsion A. The procedure for the heating and filtration was the same as described under B.

E

| | Parts |
|---|---|
| Emulsion A | 40 |
| Tert. butyl hydroperoxide (10% available oxygen) | 2.82 |
| Mixture of sodium alkyl sulfates | 1.64 |

The peroxide and the sodium alkyl sulfates were thoroughly mixed and then added to Emulsion A. The mixture was then treated as described under B.

F

| | Parts |
|---|---|
| Emulsion A | 40 |
| Tert. butyl perbenzoate | 3.42 |
| Mixture of sodium alkyl sulfates | 3.42 |

The perbenzoate and the sodium alkyl sulfates were thoroughly mixed and added to Emulsion A. The heating and filtration were carried out as described under B.

The amounts of oxidizing agents were chosen so as to contain the same amount of available oxygen. Wherever the mixture of sodium alkyl sulfates was added in the oxidations an amount of the 50% active paste equal to the active material in the oxidizing agent was used to secure good emulsification.

The unoxidized Emulsion A and the five oxidized emulsions B to F were applied to 10″ x 10″ samples of wool flannel. The wool samples weighed approximately 13 to 14 parts. The wool sample was immersed in a bath at 60° C. containing 2.0 parts of 50% acetic acid in 260–280 parts of water (20 times the weight of the wool sample). After 5 minutes an amount of emulsion containing a weight of polymer corresponding to 4.5% of the weight of the wool sample was added. Starting 5 minutes later portions of 6 parts of 15% sodium sulfate solution were added to the bath at 60° C. at approximately 5 minute intervals until the bath was exhausted. The weights of the samples and the amounts of emulsion used for each sample together with other details will be found in the table.

Table

| Sample | Emulsion | Percent Polymer in Emulsion | Parts Wool | Parts Emulsions | Portions 15% sod. sulf. soln. | Exhaustion Time, Min. |
|---|---|---|---|---|---|---|
| A | A | 33.3 | 13.74 | 1.86 | 4 | 35 |
| B | B | 27.4 | 13.97 | 2.29 | 13 | 50 |
| C | C | 27.7 | 13.74 | 2.26 | 8 | 45 |
| D | D | 26.1 | 13.43 | 2.31 | 7 | 35 |
| E | E | 30.0 | 13.10 | 1.97 | 7 | 35 |
| F | F | 28.4 | 13.40 | 2.13 | 7 | 35 |

The wool samples were rinsed with warm water and dried at 60° C. They were then examined for a sticky or greasy feel.

While Sample A which had been treated with the unoxidized emulsion, had a very greasy feel, Samples B to F, treated with the oxidized emulsions, showed a substantially non-greasy feel. Among the samples treated with the oxidized emulsions the order of increasing unpleasant hand seemed to be C (ammonium persulfate), F (tert. butyl perbenzoate), D (acetyl peroxide), B (benzoyl peroxide), E (tert. butyl hydroperoxide), although all oxidized emulsions were greatly superior to the unoxidized emulsion.

*Example 7.*—An emulsion containing a copolymer of α, p-dimethyl styrene and butadiene was prepared. The butadiene was passed over calcium chloride and condensed in a pressure reactor cooled to below −5° C., 22.5 parts of butadiene were weighed out in the reactor. 2.5 parts of α, p-dimethyl styrene, which had previously been distilled, were added, followed by 50 parts of a buffer solution of pH 11, 3 parts of a 10% ammonium persulfate solution and 2.5 parts of sodium lauryl sulfate. The buffer solution of pH 11 had been made up by dissolving 35.8 parts of disodium phosphate and 7.16 parts of trisodium phosphate in 980 parts of distilled water. The reactor was then sealed, allowed to come to room temperature and put in an agitator with a constant temperature bath at 45° C.

After 24 hours the reactor was taken out, cooled and opened. Only slight pressure was noticed on opening. Thus complete polymerization with a polymer content of 33⅓% was obtained.

40 parts of this emulsion were oxidized with a mixture of 4.28 parts of benzoyl peroxide and 4.28 parts of a 50% active mixture of sodium alkyl sulfates. The peroxide and the sodium alkyl sulfates were ground together in a mortar, before the mixture was added to the emulsion. The reaction mixture was then kept at 80–90° C. for 1½ hours under a reflux condenser. A slight amount of polymer separated out during the oxidation and was removed by filtration. The polymer content of this treated emulsion was 27.4% after treatment.

Both the unoxidized and the oxidized emulsions were applied to 10″ x 10″ samples of wool flannel. The samples, weighing 13.43 parts and 13.08 parts respectively, were immersed in baths at 60° C. containing 2.0 parts of 50% acetic acid in a volume of water 20 times the weight of the wool samples. After 5 minutes an amount of emulsion containing a weight of polymer corresponding to 4.5% of the weight of the wool sample was added to the baths. Starting 5 minutes later, portions of 6 parts of 15% sodium sulfate solution were added at intervals of approximately 5 minutes, until the baths were exhausted. In the case of the unoxidized emulsion four portions of salt solution were added and the exhaustion time was 35 minutes. Nine portions of salt solution were added to the bath with the oxidized emulsion and the exhaustion time was 65 minutes.

The samples were rinsed with warm water and dried at 60° C. They were then examined for a greasy or tacky feel. While the sample treated with the unoxidized emulsion had a very greasy feel, the sample treated with the oxidized emulsion had a substantially non-greasy feel.

*Example 8.*—A butadiene polymer emulsion was prepared as follows: 6 parts of soap ("Ivory Flakes") was dissolved in 125 parts of water and the pH of the water-soap solution was adjusted to 10 by the addition of a small amount of 5% sodium hydroxide solution. The following catalyst and regulators were then added to the soap solution, 0.1 part of dodecyl mercaptan, 0.01 part of potassium ferricyanide, 0.2 part of potassium persulfate. 50 parts of pure butadiene was then added to the other ingredients and the resulting emulsion agitated for 16 hours. The polymerization reaction was carried out in a steel jacketed kettle. The polymerization reaction, which is exothermic, was controlled by controlling the temperature of the water flowing through the jacket. Throughout the first 8 hours of the reaction, the jacket temperature was controlled to 128° F., then the temperature increased to 148° F. for the next 8 hours. In the early stages of the reaction, while the jacket was being controlled at 128° F., the internal temperature of the batch reached a peak of 140° F. After 16 hours the reaction was substantially complete as indicated by a very slight pressure within the reactor. The emulsion was then subjected to a vacuum of approximately 15 pounds per square inch to draw off the very small amount of monomer gases that may be present. The polymer emulsion was then given an oxidation treatment as follows: added 1% of the sodium salt of sulfonated oleyl alcohol and 2½% of a 30% hydrogen peroxide solution, then heated for 1 hour, the temperature rising gradually to 200° F. The emulsion was used to treat woolen fabrics as follows: 118 parts of wool were placed in a bath containing 2,360 parts of water and 20 parts of 50% acetic acid, 21 parts of the emulsion containing 0.15 part of phenyl beta naphthylamine added and the bath heated to 60° C. 35 parts of sodium sulfate was slowly added over a period of 50 minutes. Complete absorption took place during this time. The wool was rinsed and dried. The wool pieces had a characteristic wool-like feel but no trace of stickiness or waxiness. The treated woolen possesses excellent shrinkproof characteristics.

Having thus set forth our invention, we claim:

1. A bath for treating wool to give shrinkproofing with substantially normal hand which comprises an aqueous substantially stable emulsion of a synthetic butadiene polymer in amount to give 1 to 25% by weight of polymer deposition on the wool, a non-cationic emulsifying agent, and at least 25% by weight on the polymer of a water-soluble neutral salt of an alkali metal as conditioning electrolyte, the pH of the bath being below 7, the particles of polymer being in completely cross-linked condition the polymer in coagulated condition being crumbly and not millable on a rubber milling machine.

2. A bath as set forth in claim 1 including an antioxidant for the polymer.

3. A bath as set forth in claim 1, in which the polymer is a homo-butadiene polymer.

4. A bath as set forth in claim 1, in which the emulsifying agent is anionic.

5. The method of treating fibers to improve their characteristics which comprises immersing said fibers in an aqueous emulsion as set forth in claim 1 at a temperature of from 40° C. to the boiling point of the bath.

JOHN B. RUST.
CHARLES W. PFEIFER.

REFERENCES CITED

The following references are of record in the file of this patent:

UNITED STATES PATENTS

| Number | Name | Date |
|---|---|---|
| 2,317,385 | Kock et al. | Apr. 27, 1943 |
| 2,340,358 | Young | Feb. 1, 1944 |
| 2,344,843 | Wellman | Mar. 21, 1944 |
| 2,378,732 | Semon et al. | June 19, 1945 |